United States Patent [19]

Crockett et al.

[11] Patent Number: 4,833,296

[45] Date of Patent: May 23, 1989

[54] CONSUMABLE WELDING ELECTRODE AND METHOD OF USING SAME

[75] Inventors: Dennis D. Crockett, Mentor; Robert P. Munz, Jefferson, both of Ohio

[73] Assignee: The Lincoln Electric Company, Cleveland, Ohio

[21] Appl. No.: 138,880

[22] Filed: Dec. 29, 1987

[51] Int. Cl.[4] .............................................. B23K 35/02
[52] U.S. Cl. ............................. 219/145.22; 219/73.21
[58] Field of Search .................. 219/73.2, 73.1, 145.1, 219/145.22, 145.23, 145.31, 146.1, 76.1

[56] References Cited

U.S. PATENT DOCUMENTS

| | | | |
|---|---|---|---|
| 3,767,891 | 10/1973 | Haverstraw et al. | 219/146 |
| 3,875,363 | 4/1975 | Arikawa et al. | 219/73.1 |
| 4,125,758 | 11/1978 | Oishi et al. | 219/73.1 |

*Primary Examiner*—E. A. Goldberg
*Assistant Examiner*—Donovan
*Attorney, Agent, or Firm*—Body, Vickers & Daniel

[57] ABSTRACT

An improved consumable electric arc welding electrode having an outer ferrous metal sheath, such as a low carbon steel sheath, which is formed around a generally concentric core of compressed particulate fill material to be used for depositing an all weld metal of steel in multiple passes with a minimum tensile strength of about 72,000 psi and a minimum elongation of about 22 percent wherein the fill material includes aluminum in an amount greater than about 1.50 percent of the total electrode weight to provide a correlated amount of aluminum in the deposited metal. This improvement involves a particulate fill material producing a combination of nickel and manganese content in the range of 2.5-4.0 percent by weight of the total electrode with the nickel being greater than about 0.5 percent, the manganese being in the range of 0.7-2.0 percent and both the aluminum and the carbon in the fill material being properly controlled whereby the deposited all weld metal, when the sheath and core materials are melted and deposited, has a percentage by weight of aluminum greater than about 1.20 percent and a percentage of carbon by weight of less than about 0.12 percent.

17 Claims, No Drawings

CONSUMABLE WELDING ELECTRODE AND METHOD OF USING SAME

The present invention pertains to the art of electrode arc welding and more particularly to an improved electrode and a method for electric arc welding in air using a self-shielding, consumable, cored electrode. The invention is particularly applicable for arc welding in air using a bare tubular electrode wherein the flux material is contained inside the tube as a particulate fill which produces alloying metals as well as the slag, fluxing and shielding material. Such consumable electrodes are well known in the art as self shielding electrodes whereby the fill material in the core surrounded by the tubular sheet metal, in the form of low carbon steel, produces alloying elements to effect the mechanical properties of the weld metal deposited by the electrode as it is melted in the arc welding process. The present invention relates to a composition of the alloying material within the particulate fill of the core within the outer tubular sheath of the electrode and it will be described with particular reference thereto. It is appreciated that the invention involves a self-shielding, cored, consumable electrode wherein other particulate material of the core produces the fluxing and sheilding effect. This other material is not a part of the present invention and is standard technology in the electrode field. The basic slag system of prior electrodes is not changed in producing an improved electrode by the present invention.

INCORPORATION BY REFERENCE

As background information, U.S. Pat. No. 3,767,891 to Haverstraw is incorporated by reference to explain metallurgical phenomenon experienced in electrodes of the general type to which the present invention is an improvement. This is not an electrode specifically improved by the present invention.

DISCLOSURE

In producing self-shielding, consumable, cored electrodes of the type used for multiple weld passes to form a bead, the Assignee has determined and it is now well known that the particulate fill material should include sufficient aluminum to reduce the deleterious effects of oxygen and nitrogen entrapped within the weld metal during the deposition process. By incorporating relatively high amounts of aluminum the electrode is easy to utilize because it is less sensitive to the cleanliness of the steel being welded and the welding procedure being employed. The weld bead has a superior appearance and greater resistance to porosity. For that reason, alloying aluminum is added to the fill material to produce an all weld metal with aluminum substantially exceeding 1.20 percent of the all weld metal deposit. However, such high aluminum content tends to prevent transformation of the structure of the weld deposit, thus, forming large grains which substantially lower the ductility of the weld metal. Indeed, aluminum can cause ductility so low that brittle weld metal is deposited which will easily fracture. Consequently, it has been somewhat standard practice to add alloying carbon in the fill material to produce transformation into a fine grain, ductile structure. Electrodes of the type to which the present invention is directed have heretofore utilized a carbon-aluminum system whereby the aluminum is increased to about the maximum extent possible, about 1.8 percent of the all weld metal, and the low ductility otherwise created by the aluminum is avoided by increasing the carbon in the all weld metal to a level usually between 0.2 and 0.3 percent by weight. Balancing of aluminum and carbon produces a satisfactory weld metal deposit from a ductility perspective. In the art, the aluminum content in the fill material generally cannot exceed an upper value for two reasons. The limit of this aluminum-carbon system is controlled by the need for an acceptable level of all weld metal ductility, which property is decreased with excessive levels of carbon and high tensile strength. Consequently, satisfactory results in a carbon-aluminum system can usually not be obtained for aluminum content exceeding about 2.0 percent in the all weld metal. Beyond the ductility limits of this type allowing system, the American Welding Society (AWS) has placed an upper limit of 1.8 percent aluminum in all weld metal deposit produced by this type electrode. This aluminum content in the all weld metal deposit is obtained by a generally corresponding amount of alloying aluminum in the particulate material forming the core of the electrode. For equal conditions, there is a direct correlation between the aluminum of the core material, as a percentage of the electrode including the iron or steel sheath, and the aluminum percentage of the all weld metal. Statement of percentages of aluminum can have some general applicability. About 2.0 percent aluminum by weight in the total electrode typically produces about 1.6 percent aluminum by weight in the all weld metal. This same general ratio applies to other percentages of aluminum. A similar relationship applies to the carbon in the aluminun-carbon system employed in the electrode material to which the present invention is an improvement.

The American Welding Society specifies requirements for various self shielding consumable electrodes to deposit mild steel in multiple passes. One of the more common electrode classifications is E7OT-7 which requires the electrode to produce a weld deposit meeting a minimum yield strength of 60,000 psi, a minimum tensile strength of 72,000 psi and a minimum elongation of 22%. This is a somewhat standard specification for an electrode of the type to which the present invention is directed. To produce an electrode meeting these requirements, the aluminum and carbon system has heretofore been adjusted in a fashion to produce the desired advantage of high aluminum of about 1.45 and preferably above about 1.50, but below about 1.8 percent of the all weld metal, with an appropriate level of carbon, typically between 0.24 and 0.28 percent of the all weld metal, to produce the desired ductility. The disadvantage of this particular type of self shielding, consumable cored electrode is that the notch toughness is quite low apparently due to carbides at the grain boundaries as the carbon is increased to enhance ductility. In addition, the deposition rates of cored electrodes heretofore formulated to comply with the AWS specification E7OT-7 have been a relatively high. At a high deposition rate, it is even more difficult to obtain any substantial notch toughness of the deposited all weld metal due to the inherently thicker weld beads and reduced percentage of grain refinement from subsequent passes that make up a typical weld. In view of this situation, the AWS specification does not require a particular level of notch toughness for electrodes meeting the E7OT-7 specification. As a result, the use of an E7OT-7 type electrode has heretofore been typically limited to those applications for which minimum notch toughness values are not a requirement.

THE INVENTION

The present invention relates to an improvement in a self shielding, cored, consumable electrode using an aluminum based deoxidation and nitrogen scavenging system which obtains the good resistance to porosity and a voltage range characteristic of electrodes containing a relatively high amount of aluminum in the core material while achieving better ductility and a significant increase in notch toughness, i.e. exceeding about 35 ft-lbs at 32° F. on the Charpy V-notch scale. Beyond obtaining the beneficial results of a cored electrode for depositing steel in multiple passes with the advantages of a high aluminum content sand with a significant increase in notch toughness, the present invention also maintains a high deposition rate. The AWS maximum aluminum in a self-shielded system to which the present invention is directed is 1.8 percent of the all weld metal which is not exceeded by aluminum in the fill material amounting to a maximum of about 2.3 percent of the electrode including the metal sheath. Consequently, the high aluminum in the alloying system to which the present invention is directed produces an aluminum content in the all weld metal of no more than 1.8 percent aluminum. To retain the welding characteristics and other advantages of such a high aluminum self-shielded system, the alloying aluminum of the present invention is maintained at a level exceeding about 1.50 percent of the total electrode so that the all weld metal has at least about 1.20 percent aluminum. Preferably, the aluminum in the fill material is such to produce at least 1.50 percent aluminum in the deposited metal.

In accordance with the invention, the carbon content in the alloying system is reduced from that used in the prior carbon-aluminum based alloying system and a combination of nickel and manganese is added to the particulate fill material to promote formation of austenite without producing structures that would have a deleterious effect on the notch toughness of the all weld metal. In this fashion, a cored consumable electrode having no external gas shield is provided with the advantages of the high aluminum content while having increased notch toughness. This result has been unobtainable through the years in a high aluminum, self-shielded system for producing steel deposits in multiple passes. By reducing the carbon in the alloying system, carbide formation at the grain boundary is apparently reduced with results in an increase in notch toughness.

In accordance with the invention, alloying carbon in the fill material is usually reduced to a minimum. By reducing the carbon in the alloying portion of the fill material, the all weld metal has a carbon content less than 0.12 percent and preferably less than 0.10 percent.

The present invention is the improvement of a self-shielded electrode wherein the carbon content in the alloying system of the particulate fill is reduced so that the carbon in the metal sheath is essentially the only carbon in the electrode for alloying the weld metal. A combination of nickel and manganese is added to the alloying system of the fill material to produce a combination of total electrode nickel and manganese in the range of about 2.5-4.0 percent by weight of the electrode, with the nickel being greater than about 0.5 percent by weight of the electrode and the manganese being in the range of 0.7 to 2.0 percent by weight of the electrode. The carbon of the fill material is usually less than 0.05 percent which is essentially elimination of carbon in the fill material itself.

By producing an electrode in accordance with this alloying system for the fill material, the deposited all weld metal has aluminum percentage by weight greater than 1.20 percent, and preferably greater than 1.50 percent, and a carbon percent by weight of less than about 0.12 percent, and preferably less than about 0.10 percent. Use of combined nickel and manganese constituents in the alloying system of the fill material produces weld metal notch toughness heretofore unobtainable by the high carbon content in the fill material of the prior electrode with a perceptible increase in ductility. This is an improvement over prior art self-shielded, cored electrodes of this type.

The primary object of the present invention is the provision of a self shielding, cored consumable electrode utilizing a fill material having an alloying system with a high aluminum content which produces a weld deposit having a Charpy V-notch toughness of at least about 35 ft-lbs at 32° F. .

Another object of the present invention is the provision of a method of multiple pass welding with an electrode of the type defined above.

The improved electrode of the present invention has substantial operator appeal and handling characteristics that allow it to be used in construction welding of various plate thicknesses. The electrode has good penetration, good bead shape, good slag removal and a shiny bead suface which make it a good choice for many arc welding applications. The improved electrode is similar in operation to an AWS E7OT-7 electrode; however, it differs from prior electrodes of this type by producing weld metal having impact properties not obtainable by the heretofore employed metallurgy based upon a carbon-aluminum alloying system in the fill material. In such a system, the metallic aluminum is the primary beneficial constituent and is used in the electrode to develop the self shielding feature of the electrode by providing a scavenger for nitrogen and oxygen in the arc and in the weld puddle. Electrodes of the present invention that contain greater amounts of aluminum tend to have greater voltage range, better operating characteristics and better bead shape and bead appearance. The present invention retains the good operating characteristics of the prior carbon-aluminum alloying system with a drastically reduced carbon level. Not only are modest Charpy V-notch properties achieved by the present invention with yeild strength levels similar to the prior carbon-aluminum alloying system, but, as an added advantage, the present invention produces a greater elongation in a 0.505" tensile test specimen than was heretofore obtainable by the addition of carbon to increase ductility.

The present invention relates to the unique alloy system introduced through the fill material in an electrode of the type to which the invention is directed. This unique alloy system develops improved weld metal notch toughness. In the past, the weld deposit aluminum content of self-shielded, flux cored electrodes intended to produce good notch toughness was generally less than 1.20 percent. By using the present invention, higher aluminum up to 2.0 percent in the all weld metal can be used to improve the arc transfer and bead shape, to lower spatter, and to produce a wide voltage range while improving resistance to weld bead porosity.

Several electrodes incorporating the present invention were formulated as set forth in Example I, Example II, and Example III.

EXAMPLE I

A consumable electrode was manufactured using a mild steel sheath around a core of compressed particulate fill material wherein the fill material was 18.5 percent of the total electrode weight and the sheath was the remainder. The sheath had a carbon content of about 0.05 percent of the sheath and a manganese content of about 0.35 percent of the sheath, and the fill material was:

|  | % of Fill | % of Electrode |
| --- | --- | --- |
| (1) Manganese Metal Powder | 5.50 | 1.02 |
| (2) Iron Powder | 37.00 | 6.85 |
| (3) Aluminum Metal Powder | 11.00 | 2.04 |
| (4) Nickel Metal Powder | 8.10 | 1.50 |
| (5) Fluxing and Shielding Ingredients | 38.40 | 7.10 |

This electrode was formed into a 3/32 inch diameter consumable rod and used to make a multiple pass butt weld in the flat position on ¾ inch thick plain carbon steel. The welding parameters used were 150 inches per minute wire feed speed, 325 amperes, DC electrode negative, 25 arc volts, a 1 1/2 inch electrical stickout, and a 300° F. interpass temperature. The deposition rate was approximately 11.4 pounds of weld metal deposited per hour.

The all weld metal mechanical properties and deposit chemistry obtained from this test are as follows:

| Yield Strength: | 69,500 psi |
| --- | --- |
| Tensile Strength: | 84,700 psi |
| % Elongation: | 26% |
| Charpy V-Notch Impact Strength: | 46 ft-lbs at +32° F. |
| | 31 ft-lbs at 0° F. |
| Deposit Chemistry: | .088% Carbon |
| | 1.33% Manganese |
| | .09% Silicon |
| | 1.63% Aluminum |
| | 1.41% Nickel |

EXAMPLE II
The consumable electrode of Example I was changed as follows:

|  | % of Fill | % of Electrode |
| --- | --- | --- |
| (1) Manganese Metal Powder | 3.40 | .68 |
| (2) Manganese Oxide | 4.05 | .81 |
| (3) Iron Powder | 35.10 | 7.02 |
| (4) Aluminum Metal Powder | 11.30 | 2.26 |
| (5) Nickel Metal Powder | 8.10 | 1.62 |
| (6) Fluxing and Shielding Ingredients | 38.05 | 7.61 |

The fill material of the electrode in Example II was 20.0 percent of the total electrode weight and the sheath was the remainder.

Using the test method of Example I the following all weld material mechanical properties and deposit chemistry were obtained with the consumable electrode of Example II.

| Yield Strength: | 72,100 psi |
| --- | --- |
| Tensile Strength: | 85,900 psi |
| % Elongation: | 28% |
| Charpy V-Notch Impact Strength: | 43 ft-lbs at +32° F. |
| | 24 ft-lbs at −20° F. |
| Deposit Chemistry: | .079% Carbon |
| | 1.47% Manganese |
| | .16% Silicon |
| | 1.55% Aluminum |
| | 1.60% Nickel |

EXAMPLE III
The consumable electrode of Example I was changed as follows:

|  | % of Fill | % of Electrode |
| --- | --- | --- |
| (1) Manganese Oxide | 4.05 | .84 |
| (2) Iron Powder | 38.50 | 7.97 |
| (3) Aluminum Metal Powder | 11.30 | 2.34 |
| (4) Nickel Metal Powder | 8.10 | 1.68 |
| (5) Fluxing and Shielding Ingredients | 38.05 | 7.88 |

The fill material of the electrode in Example III was 20.7 percent of the total electrode weight and the sheath was the remainder.

Using the test method of Example I the following all weld metal mechanical properties and deposit chemistry were obtained with the consumable electrode of Example III.

| Yield Strength: | 63,600 psi |
| --- | --- |
| Tensile Strength: | 78,400 psi |
| % Elongation: | 24% |
| Charpy V-Notch Impact Strength: | 51 ft-lbs at +32° F. |
| | 34 ft-lbs at 0° F. |
| Deposit Chemistry: | .082% Carbon |
| | .98% Manganese |
| | .16% Silicon |
| | 1.76% Aluminum |
| | 1.63% Nickel |

From these three examples and other tests, it was found that when using a particulate fill material formulated to produce an electrode alloy system with a nickel and manganese combination in the range of 2.5–4.0 percent by weight of the electrode wherein the nickel is greater than 0.5 percent of the weight of the electrode and the manganese is in the range of 0.7 to 2.0 percent by weight of the electrode and when limiting the carbon in the electrode such that the all weld metal carbon does not exceed 0.12 percent by weight, the AWS tensile and elongation requirements for an E70T-7 electrode were obtained with a Charpy V-notch toughness exceeding 35 ft-lb at 32° F.

The preferred ranges of operative elements in the all weld metal employing the present invention are:

|  | % All Weld Metal |
| --- | --- |
| (a) Carbon | .06 to .10 |
| (b) Manganese | 1.0 to 1.5 |
| (c) Aluminum | 1.40 to 1.75 |
| (d) Nickel | 1.4 to 2.0 |

Of course other metal residue such as phosphorous 0.02 maximum and sulfur 0.01 maximum were also present in the weld deposit since they are available from surrounding steel of the system as well as in certain reducible compounds of the slag system.

In the examples, the manganese was obtained partially from manganese oxide in the fill material, which is readily available in powdered form. Of course, the nickel and manganese can be included in any form reducible by the aluminum to produce elemental nickel and manganese for alloying in the weld metal. In accordance with the invention, the carbon in the electrode fill material and steel sheath is controlled such that the carbon content of the all weld metal deposit does not exceed 0.12 percent by weight and is preferably less than 0.10 percent of weight of the all weld metal. The aluminum in the fill material is provided by powdered aluminum and is present in a percentage greater than 1.50 percent by weight of the electrode and less than 2.5 percent by weight of the electrode. In this fashion, the all weld metal includes aluminum in the general range of 1.2 percent to 2.0 percent by weight of the all weld metal.

In accordance with another aspect of the present invention, there is provided a method of electric arc welding in air (i.e. no external gas shielding) by a single or multiple passes of a self shielding, consumable cored electrode of the type constructed in accordance with the present invention. This electrode can provide a deposition rate exceeding about 10 pounds per hour with a Charpy V-notch toughness of at least 35 foot-pounds at 32° F. This method includes the steps of providing a sheath of steel having a carbon content of at least about 0.06 percent by weight of the electrode and of providing a fill material in the sheath which provides, as an electrode alloying system, a combination of nickel and manganese in the range of 2.5-4.0 percent by weight of the electrode with the nickel being greater than 0.5 percent by weight of the electrode and the manganese being in the range of 0.7 to 2.0 percent by weight of the electrode. The alloying aluminum of the present invention is maintained at a level exceeding about 1.50 percent of the total electrode and the carbon content in the sheath and fill material combined is less than about 0.15 percent by weight of the electrode so that the deposited all weld metal, when the electrode is melted and deposited has an aluminum alloy percentage by weight greater than about 1.2 percent and a carbon alloy percentage by weight of less than about 0.12 percent. The method includes further passing an electrical current through the electrode to create an electric arc for melting the sheath and core materials and depositing the metal of the electrode onto the workpiece as an all weld metal having at least 1.20 percent aluminum and less than 0.12 percent by weight of carbon. By employing this method, deposition rates substantially greater than 10 pounds per hour are obtainable in multiple pass welding while maintaining compliance with AWS E7OT-7 strength and ductility requirements and while obtaining a Charpy V-notch toughness in excess of 35 ft-lbs at 32° F.

The fill material includes alloying, fluxing and shielding ingr first of which is changed by the present invention. When considering the examples, the fill is found to include iron powder which forms another source of iron for the weld and is not a part of the above three classes of fill ingredients.

Having thus defined the invention, the following is claimed:

1. In a self-shielding consumable electric arc welding electrode having an outer ferrous metal sheath formed around a generally concentric core of compressed particulate fill material to be used for depositing an all weld metal of steel in multiple passes with a minimum tensile strength of about 72,000 psi and a minimum elongation of about 22%, the improvement comprising: said fill material including aluminum in an amount greater than about 1.50 percent of the total electrode weight, and a combination of nickel and manganese content in the range of 2.5-4.0 percent by weight of the total electrode with said nickel being greater than about 0.5 percent, said manganese being in the range of 0.7 to 2.0 percent, and carbon in said fill material being limited whereby the deposited all weld metal when said sheath and core are melted and deposited has a percentage of carbon by weight of not more than 0.12 percent.

2. The improved cored, consumable electrode, as defined in claim 1, wherein said nickel in said particulate fill material is at least partially in the forming of NiX wherein X is an element, or elements, reducible by aluminum in an electric arc.

3. The improved cored, consumable electrode, as defined in claim 2, wherein said manganese in said particulate fill material is at least partially in the form of MnX where X is an element, or elements, reducible by aluminum in an electric arc.

4. The improved cored, consumable electrode, as defined in claim 3, wherein said Charpy V-notch strength of said all weld metal is at least 35 ft-lbs at 32° F.

5. The improved cored, consumable electrode, as defined in claim 4, wherein said aluminum in said fill material is greater than 1.50 percent and less than about 2.5 percent by weight of the total electrode.

6. The improved cored, consumable electrode, as defined in claim 5, wherein said carbon of said sheath and fill material is included in an amount selected to provide an all weld material having a carbon content of less than 0.12 percent by weight of the all weld metal.

7. The improved cored, consumable electrode, as defined in claim 6, wherein said carbon of said all weld metal has a percentage of less than 0.10 percent by weight of the all weld metal.

8. The improved cored, consumable electrode, as defined in claim 1, wherein said manganese in said particulate fill material is at least partially in the form of MnX wherein X is an element, or elements, reducible by aluminum in an electric arc.

9. The improved cored, consumable electrode, as defined in claim 8, wherein said Charpy V-notch strength of said all weld metal is at least 35 ft-lbs at 32° F.

10. The improved cored, consumable eletrode, as defined in claim 2, wherein said Charpy V-notch strength of said all weld metal is at least 35 ft-lbs at 32° F.

11. The improved cored, consumable electrode, as defined in claim 1, wherein said Charpy V-notch strength of said all weld metal is at least 35 ft-lbs at 32° F.

12. The improved cored, consumable electrode, as defined in claim 8, wherein said aluminum in said fill material is greater than 1.50 percent and less than about 2.5 percent by weight of the total electrode.

13. The improved cored, consumable electrode, as defined in claim 2, wherein said aluminum in said fill material is greater than 1.50 percent and less than about 2.5 percent by weight of the total electrode.

14. The improved cored, consumable electrode, as defined in claim 1, wherein said aluminum in said fill material is greater than 1.50 percent and less than about 2.5 percent by weight of the total electrode.

15. The improved cored, consumable electrode, as defined in claim 8, wherein said carbon of said sheath and fill material is included in an amount selected to provide an all weld material having a carbon content of not more than 0.12 percent by weight of the all weld metal.

16. the improved cored, consumable electrode, as defined in claim 2, wherein said carbon of said sheath and fill material is included in an amount selected to provide an all weld material having a carbon content of less than 0.12 percent by weight of the all weld metal.

17. A method of electric arc welding in air by multiple passes of a self-shielding consumable cored electrode at a deposition rate exceeding 10 pounds per hour with a notch toughness of at least 35 ft-lbs at 32° F., said method comprising the steps of:
   (a) providing a fill sheath having a carbon content of at least about 0.06 percent by weight of said electrode;
   (b) providing a fill material in said sheath producing a combination of nickel and manganese content in the range of 2.5-4.0 percent by weight of the total electrode with said nickel being greater than about 0.5 percent, said manganese being in the range of 0.7 to 2.0 percent and said carbon in said electrode being included in an amount selected to provide an all weld metal having a carbon content of not more than 0.12 percent by weight, and aluminum in said fill material being not less than about 1.50 percent by weight of the total electrode;
   (c) passing an electrical current through said electrode to create an electric arc for melting said sheath and core materials and depositing the metal of said sheath and core materials onto a workpiece as an all weld metal having at least 1.20 percent aluminum and less than about 0.12 percent by weight of carbon.

* * * * *

UNITED STATES PATENT AND TRADEMARK OFFICE
CERTIFICATE OF CORRECTION

PATENT NO. : 4,833,296
DATED : May 23, 1989
INVENTOR(S) : Dennis D. Crockett, Robert P. Munz It is certified that error appears in the above-identified patent and that said Letters Patent is hereby corrected as shown below:

Column 3, line 14, "sand" should read --- and ---; line 46, "reducting" should read --- reducing ---; line 48, "with" should read --- which ---. Column 5, line 25, "11/2" should read --- 1-1/2 ---. Column 7, line 47, "ingr" should read --- ingredients, the ---. Column 8, line 5, "forming" should read --- form ---. Column 9, line 8, delete "fill".

Signed and Sealed this

Second Day of October, 1990

Attest:

HARRY F. MANBECK, JR.

*Attesting Officer*      *Commissioner of Patents and Trademarks*